UNITED STATES PATENT OFFICE.

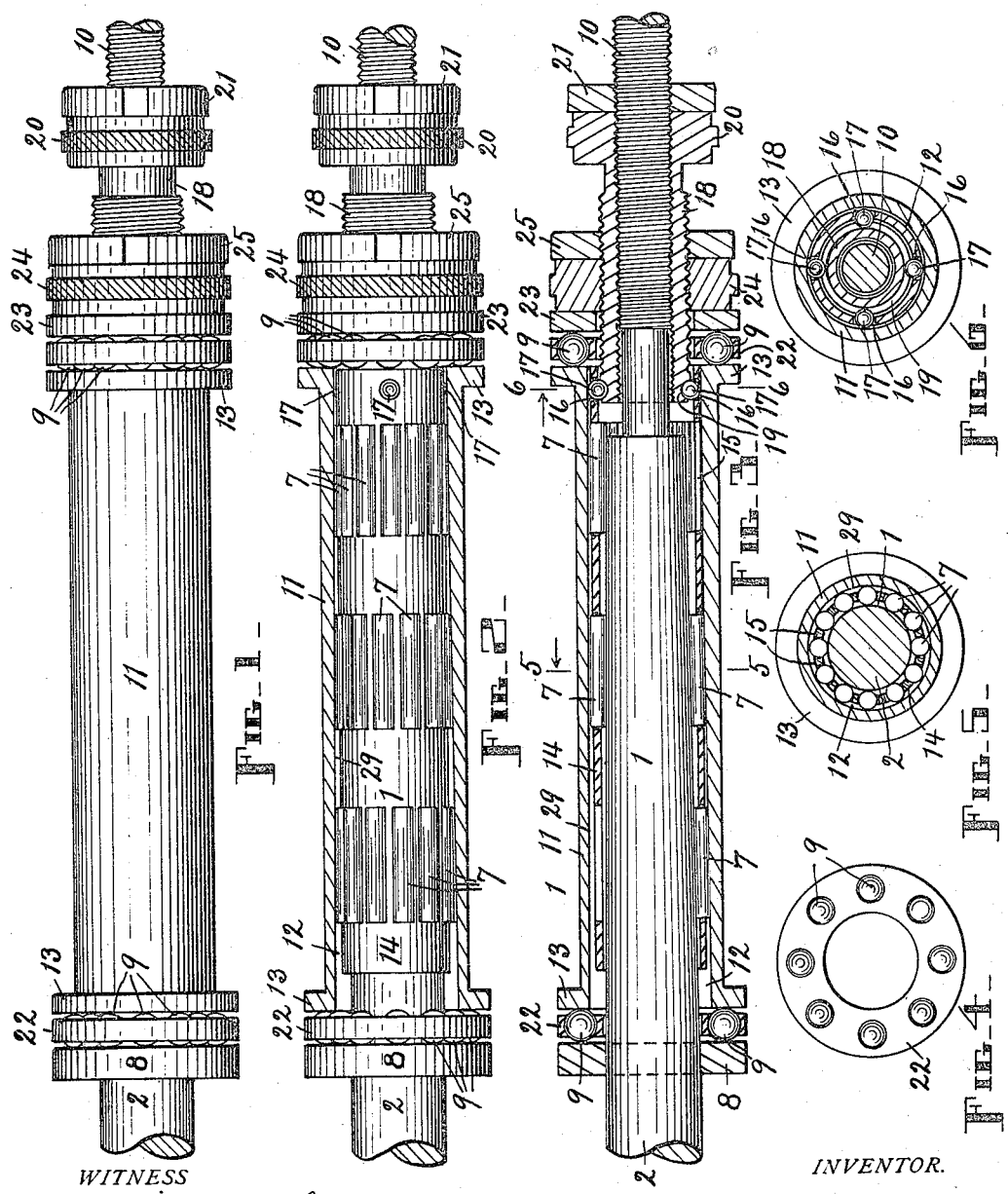

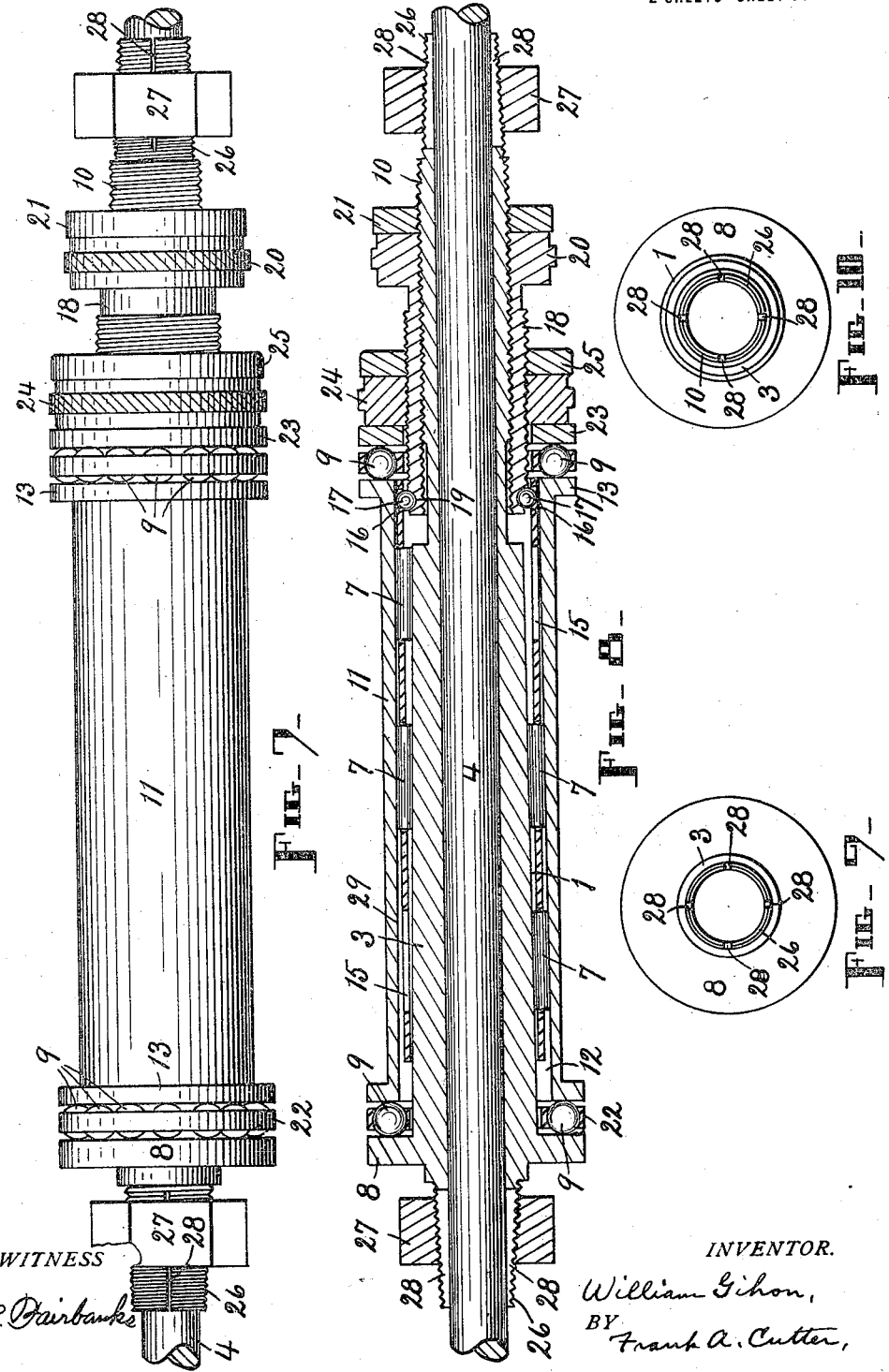

WILLIAM GIHON, OF CHICOPEE, MASSACHUSETTS.

ROLLER-BEARING.

1,244,190.  Specification of Letters Patent.  Patented Oct. 23, 1917.

Application filed October 27, 1916. Serial No. 128,031.

*To all whom it may concern:*

Be it known that I, WILLIAM GIHON, a subject of the King of England, and a resident of Chicopee, in the county of Hampden and State of Massachusetts, have invented a new and useful Roller-Bearing, of which the following is a specification.

My invention relates to improvements in shaft bearings of the roller type, as distinguished from the ball type, applicable to dynamos, motors, heavy-duty and other engines, machine-heads, idlers, and practically all other forms of rotating machinery, and to main and counter shafting as well, and resides in an axial member having a tapered part, an exterior tubular member or sleeve which is internally tapered, interposed rollers and a positioning member for such rollers, and means to actuate said last-mentioned member and with it said rollers, for the purpose of adjusting the latter on said axial member and relative to contiguous tapered surfaces of said axial member and sleeve, together with end-thrust members, and such other or auxiliary and subsidiary parts and members as may be necessary or desirable in order to render the bearing complete, practicable, and serviceable in all respects.

That roller bearings have long been considered superior to other types of bearings, aside from the lack of adequate means of radial adjustment therefor that has heretofore existed, is a fact well known, and one of the principal objects of my invention is to produce a roller bearing that is not only in and of itself a complete, practical and efficient bearing in every particular, but is capable of being radially adjusted to whatever extent may be necessary, the means for such adjustment being embodied in said bearing as a part thereof.

Roller bearings too frequently are from necessity caused to run in contact with unhardened surfaces, to the great detriment and injury of such surfaces, and another object of the invention is to provide in connection with and as parts of the bearing hardened surfaces for the rollers to run on, both inside and outside. This provision not only greatly prolongs the life of all of the running parts, but insures a constant or continued true and even or uniform motion of said parts. There is and can be no lost motion in my bearing, provided the same be properly adjusted and kept so.

Another difficulty experienced with roller bearings is the tendency to uneven wear and the consequences thereof, due to the uneven distribution of the load, wherefore still another object is to produce a roller bearing that is uniform in the distribution of the load carried by such bearing, or, in other words, a bearing upon which the load bears throughout practically the entire length of the rolling parts of said bearing and regardless of the position of said load, the leverage exerted thereby, or other factors tending to produce an uneven distribution of the load.

When the nature of the case demands it, a further object is to provide my device with lock bearings at one or both ends so there can be no relative independent endwise movement of either the device or shaft. This feature removes the need for set-collars on line shafts and countershafts.

An additional object is to provide said device with suitable and adequate end-thrust adjustable bearings. The end-thrust adjustment is operated independently of and without disturbing the radial-thrust adjustment, and the two adjustments are in a sense independent of each other.

The bearing can easily and quickly be assembled and adjusted, and has a wide range of application both to driving and driven shafts of all kinds which are independent of motors, engines, or machines, and to shafts which are elements of the latter.

Other objects and advantages will appear in the course of the following description.

A preferred embodiment of the invention, whereby I attain the objects and secure the advantages of the same, is illustrated in the accompanying drawings, and I will proceed to describe said invention with reference to said drawings, although it is to be understood that the form, construction, arrangement, etc., of the parts in various aspects are not material and may be modified without departure from the spirit of the invention.

In the drawings, in which like numerals designate like parts throughout the several views, Figure 1 is a side elevation of a roller bearing which embodies a practical form of my invention as aforesaid, said bearing here shown having incorporated with it as an actual element thereof a shaft; Fig. 2, a view similar to the first except that the outer sleeve is cut away to expose the rollers and their confining or holding and adjusting member; Fig. 3, a central longitudinal section through said bearing; Fig. 4, a side elevation of one of the end-thrust ball elements; Fig. 5, a cross-section through said bearing, taken on lines 5—5, looking in the direction of the associated arrow, in Fig. 3; Fig. 6, a cross-section on lines 6—6, looking in the direction of the associated arrow, Fig. 3; Fig. 7, a side elevation of a roller bearing which embodies my invention as aforesaid, and is similar to the first, but is applied as a separate and independent element to a shaft; Fig. 8, a central longitudinal section through the bearing illustrated in the preceding view; Fig. 9, an elevation of one end of the inner sleeve which enters into the construction of the second bearing, and, Fig. 10, an elevation of the other end of said last-mentioned sleeve.

The axial member of this roller bearing may consist of a tapered surface or part 1 of a shaft 2, with which is included a shaft extension 10, as in the first construction illustrated in connection herewith, or of an interior sleeve 3 of peculiar construction and including the tapered surface or part 1 and the extension 10, which sleeve is mounted on a shaft 4, as in the second construction illustrated in connection herewith. The part 1 is integral with the shaft 2 or with the sleeve 3, but said sleeve is, of course, a member separate or separable from the shaft 4 upon which it is mounted. Both of these axial members present hardened bearing surfaces for a plurality of bearing rollers 7.

Having explained of what the axial member of my bearing may consist, and with the understanding that such member, whether integral with a shaft or not, is a part of said bearing, I will describe in detail the two bearings which include the two forms of axial members, commencing with that shown in Figs. 1, 2, 3, 5 and 6.

The shaft 2 is provided adjacent to the large end of the tapered part 1 with a flange 8 which constitutes a revolving thrust-collar for a set of balls 9. This flange or thrust-collar may be either integral with the shaft 2 or rigidly affixed thereto. The shaft 2 has the extension 10 to which reference has been made. This extension 10 is a reduced portion of the shaft 2 and projects from the smaller end of the part 1, that is, reduced in diameter. Said extension is screw-threaded for the greater portion of its length. A tubular member or sleeve 11, internally tapered as at 29, is provided for the tapered part 1. The tapered bore 29 of the sleeve 11 is larger than the tapered part 1 so as to provide an annular passage or space 12 between said part and said sleeve for the rollers 7. The tapers of the interior and exterior walls of the space 12 are slightly different, consequently such space decreases in width from the right-hand end to the left-hand end, in the present construction and arrangement. This decrease is slight and results from tapering the part 1 a little more than the interior surface 29 of the sleeve 11 or the latter a little less than the former. Although the narrower end of the space 12 is between the larger end portions of the part 1 and the tapered interior 29 of the sleeve 11, it would be possible and perhaps practicable to change the tapers so as to locate the narrower end of said space between the smaller end portions of said part and said tapered interior of said sleeve, without materially altering the construction of the device. The rollers 7 are received in the space 12, and their diameters are such that said rollers have a running fit between the walls 1 and 29 of said space, when properly adjusted in the manner presently to be described. The rollers 7 are comparatively small in diameter and therefore require to be tapered but little if any. The sleeve 11 is a fixed member and is designed to be received in a stationary support, such as the head of a machine for example, and at the ends of said sleeve are flanges or thrust-collars 13—13 for the set of balls 9 at the left-hand end and another set of balls 9 at the right-hand end of said sleeve.

The number and arrangement of the rollers 7 may vary, but in the present case there are thirty-six of such rollers arranged in three sets, the rollers in each set having corresponding ends in a common vertical plane. The number of sets of rollers may vary as well as the number of rollers in a set. Longitudinally the rollers 7 are in staggered relationship, that is to say, the rollers in each row are so arranged that their axes are out of line with each other, with the roller that is at the larger terminal of the part 1 in advance, in the direction of rotation of the shaft 2 which direction is assumed to be from left to right, of the intermediate roller in such row, and the latter in advance, in said direction of rotation, of the roller that is at the smaller terminal of said part. As previously intimated, however, this arrangement may be varied. By employing sets of short rollers, in place of a single set of long rollers, I avoid the slipping and consequent wear that would occur at and adjacent to the terminals of the rollers which bear at the smaller terminal of the part 1, if long rollers were used; and by staggering these short rollers the contacting bearing surfaces are more uniformly located, the load is distributed, and the rotary motion of the rollers equalized.

As a positioning or spacing and holding medium for the rollers 7 in the space 12, I employ what I term a cage 14. The cage 14 is a hollow cylinder having slots 15 in the walls thereof to receive loosely the rollers 7, said slots being arranged in the manner required to position said rollers in accordance with the previously-described arrangement. The cage 14 is received in the space 12 and is movable endwise therein without contacting with either wall of such space, the thickness of the walls of said cage being considerably less than the diameter of any given roller 7, and, therefore, less than the width of said space at any given point. The double taper of the walls of the space 12 affords ample clearance for the cage 14. In the cage 14, adjacent to the right-hand end thereof, are four (more or less) holes 16, in which are the same number of balls 17.

The balls 17 form parts of a ball lock or coupling between the cage 14 and a retaining and adjusting sleeve 18 which is mounted on the shaft extension 10 in screw-threaded engagement therewith. The balls 17 are received and run in an annular groove 19 in the sleeve 18 near the inner end thereof, and bear against the inside of the fixed sleeve 11 near the right-hand end thereof, which latter end with the adjacent end of the cage 14 extends over said end of said sleeve 18. The ball lock or coupling thus formed holds the cage 14 against endwise movement, by anchoring said cage as it were to the sleeve 18, and at the same time permits said sleeve to rotate freely in the fixed sleeve 11 within which one terminal of the rotary sleeve is journaled through the medium of the balls 17.

It is now clear that, upon rotating the sleeve 18 on the shaft extension 10, said sleeve is caused to move longitudinally in one direction or the other, by reason of the screw-threaded engagement which exists between said sleeve and extension, and according to the direction of rotation of said sleeve, and to carry with it the cage 14 with the rollers 7, through the medium of the balls 17. And it is by this means and in this manner that the rollers 7 are adjusted to fit between the part 1 and the sleeve 11, and to take up wear when necessary.

The sleeve 18 is externally as well as internally screw-threaded, and has at the outer end a handle 20 which is grasped when said sleeve is turned for adjustment purposes. An ordinary set-nut or lock-nut 21 for the sleeve 18 is mounted on the extension 10 outside of the handle 20.

The two sets of balls 9 enter into the make-up of the end-thrust bearings of the device, and ordinary ring cages 22—22 of usual form are provided for said balls. One of the cages 22 is placed loosely on the shaft 2 at or adjacent to the larger terminal of the part 1, while the other of said cages is placed loosely on the sleeve 18. The balls 9 in the last-mentioned cage 22 run between the right-hand thrust-collar 13 and a thrust-collar 23 which is loosely mounted on the sleeve 18. An adjusting nut 24 for the thrust-collar 23 and a set-nut or lock-nut 25 for said adjusting nut are mounted on the sleeve 18.

Upon loosening the lock-nut 25, the nut 24 can be turned to tighten the thrust-collars 9, 13, and 23 on the balls 9, or to loosen said thrust-collars relative to said balls, according to the direction given said nut 24, after which said set-nut is retightened. The nut 24, when turned on the sleeve 18 to advance said nut on the thrust-collar 23, directly forces the latter against the contiguous balls 9, and simultaneously forces the thrust-collar 8 against its contiguous balls 9 through the medium of said sleeve and the shaft 2 with its parts.

The end-thrust adjustment can be made without disturbing the radial adjustment, but in order to change the latter adjustment it is also necessary to change the former adjustment. This is clear when it is seen that the nut 24 and associated members most effectually stand in the way of rotating the sleeve 18 on the extension 10 in the direction required to carry said sleeve farther in to the sleeve 11, on the one hand, and that said nut would be drawn away from the thrust-collar 23 and so permit one of the end-thrust bearings, if not eventually both of such bearings, to become loose, on the other hand, if said sleeve were rotated on said extension in the other direction.

The manner of assembling the members to form the complete bearing is so clear that no explanation need be given of the same beyond calling attention to the fact that the proportions, construction, and arrangement of parts are such that initially the radial adjustment of the rollers 7, which adjustment is effected through the longitudinal adjustment of said rollers and by reason of the difference in taper of the walls of the space 12, said rollers fit the wider portion or portions of said space, leaving the more constricted portion or portions of such space for the subsequent occupancy of said rollers, should adjustment demanded by looseness incident to wear on improper primary adjustment be necessary. Adjustment such as that to which attention has just been called is effected, after first loosening the lock nuts 21 and 25 and so rotating said lock-nut 25 and the nut 24 as to actuate them to the right and leave the necessary clearance between the thrust-collar 23 and said nut 24, by turning the sleeve 18 in the direction to advance it into the sleeve 11. The sleeve 18 carries with it, in the further advance into the sleeve 11, the cage 14, and the latter carries with it the rollers 7. The rollers 7 are thus moved endwise into a more restricted portion or portions of the space 12, where the required bearing fit is secured. After the rollers 7 have received their radial adjustment, the nut 24 is screwed against the thrust-collar 23 and tightened until the proper amount of pressure for the end-thrust adjustment is produced. The lock-nuts 21 and 25 are set up again after the adjustments have been made.

In the event the rollers 7 are too tight, they are actuated to the right into a wider portion or portions of the space 12, by the same means as before. The end-thrust bearings need not be readjusted, in this case, until the radial adjustment of the rollers 7 has been changed, inasmuch as the sleeve 18 is then operated in the direction to withdraw it from the sleeve 11 and so carries the adjusting nut 24 away from the thrust-collar 23. The end-thrust bearings must, however, receive attention as soon as the rollers 7 have been properly readjusted.

Supported on and by the rollers 7 in and by the fixed sleeve 11 the shaft 2 is rotatable, and with it rotates the retaining and adjusting sleeve 18, the lock-nut 21, the thrust-collars 8 and 23, the nut 24, and the lock-nut 25. The rollers 7 revolve freely in the slots 15 in the cage 14, when the shaft 2 is in motion.

All tapers are very slight indeed, as the nature of the case demands, consequently each roller 7 may be of the same diameter as that of every other roller 7, in a great many and perhaps most instances, but whenever necessary the rollers in one set may each have a trifle larger or smaller diameter, according to position of such set, than that of each roller in the next adjacent set. This provision would locate the largest rollers in the space 12 at the widest part thereof, the smallest rollers in said space at the narrowest part thereof, and the rollers of intermediate size in said space where the same is wider than it is at one end and narrower than it is at the other end.

Passing now to the roller bearing illustrated in Figs. 7 and 8, where the inner sleeve 3 is mounted on the shaft 4, it will be observed that, to all intents and purposes, as a part of the bearing said sleeve takes the place of the shaft 2 in the previous example. The sleeve 3 has besides the hardened tapered bearing part 1 and the screw-threaded extension 10, the thrust-collar 9, and there is present with said sleeve the fixed outer sleeve 11 with its hardened tapered bearing surface 29 on the inside, and the thrust-collars 13 at the ends, and there are present also the rollers 7 and the cage 14 therefor, the retaining and adjusting sleeve 18 to which said cage is locked or coupled by means of the balls 17, the other end-thrust bearing parts and their adjusting nut, and the two lock-nuts, all constructed, arranged, operated and operating substantially like similar and corresponding parts and members in the first bearing. The fixed sleeve 11 in the second bearing becomes in practice a part of or is supported by a hanger, assuming the shaft 4 to represent a main shaft or a counter-shaft. This complete bearing can, if desired, be assembled and placed on the shaft all together.

It is necessary to secure the sleeve 3 tightly to the shaft 4, after said sleeve has been located at the desired place on said shaft. Such means consist of tapered and split terminals 26—26 at the ends of the sleeve 3 including its extension 10, and nuts 27—27 screw on to such terminals and clamp the same to the shaft 4. The clamping terminals 26 have longitudinal slots 28 therein which constitute the splits and enable said terminals to be forced by the nuts 27 into firm and unyielding engagement with the shaft 4.

The shaft 4 is supported by the sleeve 3 and the latter, with the nuts 27 and the other members carried thereby, revolves with said shaft. The sleeve 3 revolves in the fixed sleeve 11 of this bearing, supported on and by the interposed rollers 7, in a similar manner as the part 1 of the shaft 2 revolves and is supported.

The ball-bearing surfaces as well as the roller-bearing surfaces are hardened.

Only such fragmentary portions of the shafts 2 and 4 are shown as are needed fully to illustrate my invention and its application.

What I claim as my invention, and desire to secure by Letters Patent, is—

1. A roller bearing comprising a rotary axial member and a fixed tubular member spaced to receive and tapered to afford radial adjustment to rollers between, when the latter are moved longitudinally, a plurality of rollers in the space between said axial member and said tubular member, and means to move said rollers longitudinally.

2. A roller bearing comprising a rotary axial member and a fixed tubular member spaced to receive and tapered to afford radial adjustment to rollers between, when the latter are moved longitudinally, a plurality of rollers in the space between said axial member and said tubular member, means to move said rollers longitudinally, and end-thrust bearings for said axial member.

3. A roller bearing comprising a rotary axial member and a fixed tubular member spaced to receive and tapered to afford radial adjustment to rollers between, when the latter are moved longitudinally, a plurality of rollers in the space between said axial member and said tubular member, means to move said rollers longitudinally, end-thrust bearings for said axial member, and means to adjust said end-thrust bearings.

4. A roller bearing comprising a rotary axial member having a tapered bearing surface, a fixed tubular member having a tapered bearing surface and spaced from said axial member, a plurality of rollers in the space between said bearing surfaces, a positioning member slotted to receive said rollers in said space, and means to adjust lengthwise said positioning member with said rollers.

5. A roller bearing comprising a rotary axial member having a tapered bearing surface, a fixed tubular member having a tapered bearing surface and spaced from said axial member, the taper of one of said surfaces being less than that of the other in order that the space between said surfaces shall be narrower at one end than at the other, a plurality of rollers in said space, a positioning member for said rollers in said space, and means to adjust lengthwise said positioning member with said rollers.

6. In a roller bearing, a rotary axial member, a fixed tubular member spaced from said axial member, a hollow cylindrical recessed member in the space between said axial member and said tubular member, and adjustable in such space, said cylindrical member being of larger diameter than said axial member and of smaller diameter than said tubular member, and rollers loosely placed in the recesses in said cylindrical member and projecting peripherally beyond the walls of said cylindrical member into contact with the walls of said space.

7. In a roller bearing, a rotary axial member and a fixed tubular member spaced and tapered to cause rollers between, when actuated longitudinally in one direction, to be thrown outwardly, a hollow cylindrical member in the space between said axial member and said tubular member, and capable of longitudinal adjustment therein, said cylindrical member having recesses in its walls, rollers loosely placed in said recesses, and means to adjust said cylindrical member with said rollers longitudinally.

8. In a roller bearing, a rotary axial member and a fixed tubular member spaced and tapered to cause rollers between, when actuated longitudinally in one direction, to be projected outwardly, a cage in the space between said axial member and said cylindrical member, and capable of endwise movement therein, said cylindrical member having sets of slots in its walls, such slots being in staggered relationship longitudinally, rollers loosely placed in said slots, and means to adjust said cage with said rollers longitudinally.

9. The combination, in a roller bearing, with a rotary axial member having an extension, a fixed sleeve, rollers between said axial member and said sleeve, and a cage for said rollers movable longitudinally in the space occupied by said rollers, of a member mounted for endwise adjustment on said extension, and a ball-bearing coupling between said last-mentioned member and said cage.

10. The combination, in a roller bearing, with a rotary axial member having an extension, a fixed sleeve spaced from said member, a cage movable longitudinally in the space between said axial member and said sleeve, and having roller slots and ball openings therein, and rollers in said slots, of a member mounted for longitudinal adjustment on said extension, said last-mentioned member having a ball groove therein, and balls in said groove and extending through said ball openings in said cage into contact with said sleeve.

11. The combination, in a roller bearing, with a rotary axial member having an extension, a fixed sleeve spaced from said member, a cage movable longitudinally in the space between said axial member and said sleeve, and having roller slots and ball openings therein, and rollers in said slots, of a member mounted for endwise adjustment on said extension, said last-mentioned member having a ball groove therein, balls in said groove and extending through said ball openings in said cage into contact with said sleeve, and means to lock said last-mentioned member to said extension.

12. The combination, in a roller bearing, with a rotary axial member having a screw-threaded extension, a fixed sleeve spaced from said member, a cage movable longitudinally in the space between said axial member and said sleeve, and having roller slots and ball openings therein, and rollers in said slots, of a screw-threaded grooved sleeve, having a handle, mounted on said extension, balls in the groove in said last-mentioned sleeve and extending through said ball openings into contact with said fixed sleeve, and a lock-nut on said extension for said screw-threaded sleeve.

13. The combination, in a roller bearing, with a rotary axial member having a screw-threaded extension, a fixed sleeve spaced from said member, a cage movable longitudinally in the space between said axial member and said sleeve, and having roller slots and ball openings therein, and rollers in said slots, of a screw-threaded grooved sleeve, having a handle, mounted on said extension, balls in the groove in said last-mentioned sleeve and extending through said ball openings into contact with said fixed sleeve, and a lock-nut on said extension for said screw-threaded sleeve, said means being adjustable.

14. The combination, in a roller bearing, of a rotary axial member having a screw-threaded extension, a fixed sleeve, rollers between said axial member and said sleeve, a cage for said rollers, a screw-threaded sleeve on said extension, and coupling means between said screw-threaded sleeve and said cage.

15. The combination, in a roller bearing, of a rotary axial member having a screw-threaded extension, a fixed sleeve, rollers between said axial member and said sleeve, a cage for said rollers, a screw-threaded sleeve on said extension, coupling means between said screw-threaded sleeve and said cage, and means to lock said screw-threaded sleeve to said extension.

16. The combination, in a roller bearing, with a rotary axial member, a fixed sleeve, rollers between said axial member and said sleeve, and a cage slotted to receive said rollers, of means to adjust said cage with said rollers.

WILLIAM GIHON.

Witnesses:
F. A. CUTTER,
A. C. FAIRBANKS.

Copies of this patent may be obtained for five cents each, by addressing the "Commissioner of Patents, Washington, D. C."